Feb. 9, 1971 D. GABOR 3,561,838
HOLOGRAPHIC IMAGING
Filed March 24, 1967

INVENTOR.
DENNIS GABOR
BY Brumbaugh, Free,
Graves & Donohue
his ATTORNEYS

:::: {.columns}
::: {.column}
United States Patent Office 3,561,838
Patented Feb. 9, 1971

3,561,838
HOLOGRAPHIC IMAGING
Dennis Gabor, London, England, assignor to Columbia Broadcasting System, Inc., New York, N.Y., a corporation of New York
Filed Mar. 24, 1967, Ser. No. 625,795
Int. Cl. G02b 27/22
U.S. Cl. 350—3.5                                8 Claims

ABSTRACT OF THE DISCLOSURE

In the particular embodiments of the invention described herein, deep holographic imaging is accomplished by polarizing the object and reference beams in two perpendicular directions and passing one of the beams twice through a quarterwave plate prior to formation of the hologram. In one form, the object illuminating beam is passed through a photographic emulsion and then through a quarterwave plate toward the object, from which it is reflected back through the quarterwave plate for interference with the reference beam. In another form, the reference beam passes through the photographic emulsion and a quarterwave plate to a mirror, from which it is reflected back through the quarterwave plate to the emulsion for interference with the object beam.

BACKGROUND OF THE INVENTION

This invention relates to holographic imaging and, more particularly, to a new and improved method of, and apparatus for, making deep holograms and to the holograms formed thereby.

In one form of holographic imaging, a photographic emulsion of very fine grain and substantial thickness is used to record a plurality of interference maxima and minima, resulting from interference of the object wave and a background or reference wave, disposed in planes which are spaced across the thickness of the emulsion at distances of approximately half a wavelength of light. When a deep hologram of this type is illuminated, an image of the object appears at the original spatial location of the object and in the original colors. Because of the selective reflection arising between the spaced plurality of maxima and minima within the emulsion, noncoherent white light may be used for illumination, rather than requiring light of the same wavelength as that used in making the hologram.

Heretofore, however, interference between the waves of the object illuminating beam and those of the reference beam, upon first passing through the emulsion, has caused an unwanted interference pattern and thereby considerable scattering in the emulsion, appreciably reducing the quality of the holographic image. Moreover, deep holography has also required absolute positional stability of the light source, the object, and the photographic emulsion at the time the hologram is made.

Accordingly, it is an object of the present invention to provide a new and improved holographic imaging apparatus which overcomes the above-mentioned disadvantages of the prior art.

Another object of the invention is to provide a method of deep holography whereby holographic images of improved quality are produced with greater convenience.

A further object of the invention is to provide a deep hologram having improved image-forming characteristics.

An additional object of the invention is to provide a holographic imaging system in which absolute stability of the emulsion is not required and only motion of the object and the reference source relative to one another must be avoided.
:::

::: {.column}
SUMMARY OF THE INVENTION

These and other objects of the invention are attained by providing an object beam polarized in one direction and a reference beam polarized in a perpendicular direction, and passing one of the beams through a birefringent element prior to interaction therebetween to produce maxima and minima in a photographic emulsion. The birefringent element is known in the art as a quarterwave plate, that is to say, one which produces a quarterwave difference in the relative phase of two waves polarized at right angles to one another. In one form of the invention, the object illumination beam is transmitted through the emulsion and through a quarterwave plate toward the object and then from the object back through a quarterwave plate to the emulsion where it interacts with the reference beam. In another embodiment, the reference beam is transmitted through an emulsion and a quarterwave plate and is reflected back through a quarterwave plate to the emulsion for interference with the beam from the object.

BRIEF DESCRIPTION OF THE DRAWING

In the accompanying drawing.

DESCRIPTION OF THE PREFERRED EMBODIMENTS

Figure 1:
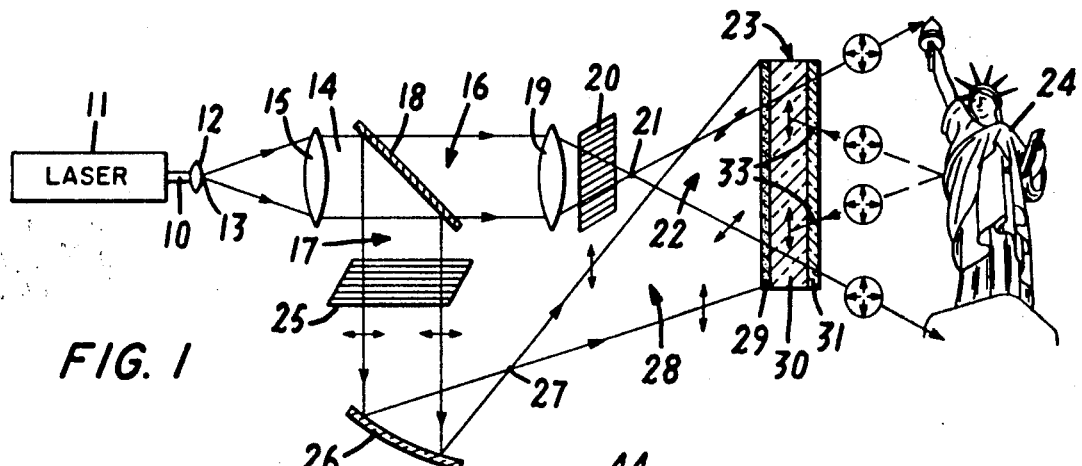
FIG. 1 is a schematic diagram illustrating one method of making deep holograms in accordance with the invention.

In the typical embodiment of the invention shown in FIG. 1, a narrow, parallel, highly monochromatic and coherent beam 10 from a laser 11 is concentrated by a lens 12 to a small focus 13 and then converted into a wide parallel beam 14 by a lens 15. This beam is split into two fractions 16 and 17 by the semi-reflecting mirror 18. The beam 16 passes through a further lens 19 which converts the parallel rays into a converging bundle and directs them through a polarizer 20 with horizontal polarization. After passing through a focus 21, the horizontally polarized bundle forms a diverging object illuminating beam 22 which is directed through a hologram recording assembly 23 so as to illuminate an object 24.

The beam 17 reflected by the semi-transparent mirror 18 passes through a polarizing filter 25 arranged so that, after reflection by a spherical mirror 26 through a focus 27, a diverging off-axis reference beam 28 directed toward the assembly 23 has vertical polarization. Preferably, the focal point 27 is below the lower edge of the assembly 23.

The recording assembly 23 includes a layer 29 of photographic emulsion, a glass support plate 30 upon which the emulsion is coated, and a quarterwave plate 31 in optical contact with the opposite side of the plate. The emulsion layer 29 is of sufficient thickness to record a substantial number of interference maxima and minima in accordance with the usual deep holography practice and may, for example, be twenty to thirty wavelengths thick. Because the object illuminating beam 22 and the reference beam 28 are polarized at right angles to each other, however, the illuminating beam cannot interfere with the reference beam to produce interference maxima and minima. Instead, during its passage through the layer 29, the illuminating beam 22 merely causes a substantially uniform low level exposure of the photographic emulsion which pro-
:::
::::

duces only negligible reflection or scattering in the developed emulsion layer.

After passing through the glass plate 30, the illuminating beam 22 is transmitted through the quarterwave plate 31. This plate comprises a layer of a birefringent material of the usual type, such as calcite, quartz, or any of several plastic materials having the same property, arranged so that the axes of the ordinary and extraordinary rays are bisected by the horizontal waves of the beam 16. Moreover, the thickness of the plate 23 is selected so that the difference in phase between the ordinary and extraordinary waves in the emerging beam is 90°, with the result that the emerging rays are circularly polarized.

The light reflected by the object 24 is also circularly polarized, except for unusual cases, so that upon its return through the quarterwave plate 31, the object beam is reconverted to plane polarized light. In this case, however, the plane of polarization is at right angles to that of the illuminating beam 22 so that the emerging rays 33 are vertically polarized. Consequently, the rays 33, containing brightness and positional information about the object 24, interfere with the reference beam 28 on their return passage through the photographic emulsion 29, producing interference maxima and minima in a plurality of spaced planes within the emulsion. In this way, a deep hologram can be made by illuminating the object through the emulsion layer without producing any undesired interference effects as a result of interference between the reference rays and the object illuminating rays.

Moreover, the reflectance of the mirror 18 is preferably adjusted so that the intensity of the reference rays 28 matches that of the object rays 33 at the emulsion layer so as to obtain optimum results. Also, the optical path length from the laser to the emulsion layer for the reference and object rays should be as nearly equal as possible so as to stay within the coherence length of the beam from the laser.

Figure 2:
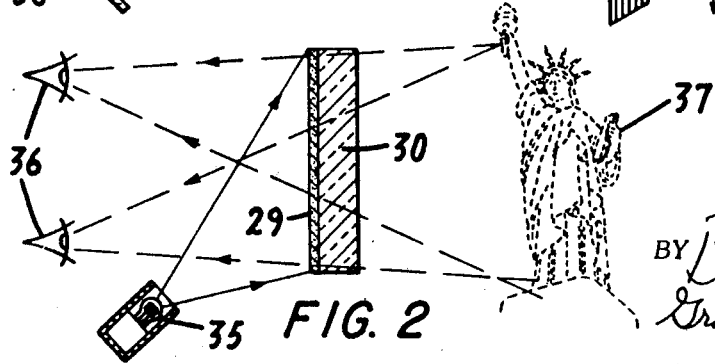
FIG. 2 is a schematic diagram illustrating the reproduction of a holographic image from a hologram made in accordance with the method of FIG. 1.

In order to produce a holographic image from a hologram made in this manner, the quarterwave plate 31 is stripped from the glass plate and may be replaced by a dark background foil (not shown). The photographic recording in the layer is then illuminated by light from a substantially point source 35 which is located at the same position with respect to the layer as the focal point 27 of the reference beam when the hologram was made. The illuminating light, however, need not be coherent or even monochromatic since the spaced planes of the interference maxima and minima within the layer 29 will extract the appropriate wavelength by selective interreflection. Consequently, a conventional source of white light may be used. Upon illumination in this manner, the eyes 36 of an observer, located on the same side of the hologram as the light source, will view a virtual holographic image 37 of the original object, in three dimensions and in natural color, at an apparent position on the opposite side of the hologram corresponding to that of the object 24 when the hologram was made, as shown in FIG. 2.

Figure 3:
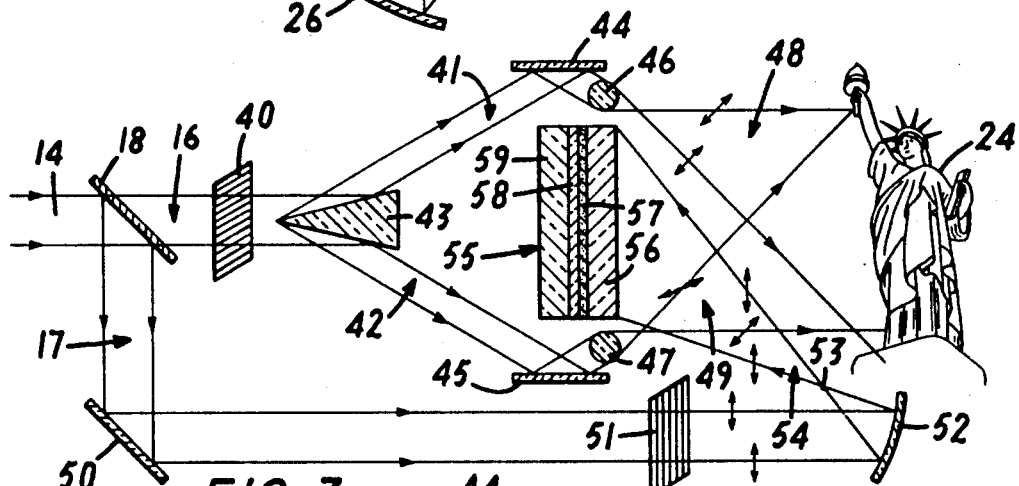
FIG. 3 is a schematic diagram illustrating another method of making deep holograms in accordance with the invention.

In the arrangement shown in FIG. 3 of the drawings, a wide parallel beam 14 from a laser is divided into two beams 16 and 17 by a semi-transparent mirror 18. The transmitted beam 16 is horizontally polarized by a polarizer 40 and is then split horizontally into two diverging beams by a wedge-shaped mirror 43. Two spaced parallel mirrors 44 and 45 direct the illuminating beam through two transparent rods 46 and 47 which act as cylindrical lenses to direct two divergent beams 48 and 49 of horizontally polarized light toward the object 24. If desired, instead of the wedge 43, a pyramidal mirror which splits the beam into four fratcions might be used so as to illuminate the object 24 from four sides. Also, in order to obtain diffusion of the light in the direction of the axis of the rods 46 and 47, cross cylindrical lenses (not shown) may be used or, alternatively, these rods can be fitted with circular grooves or be in the shape of polished screws.

The light beam 17 reflected from the mirror 18 is the reference beam. This is reflected at a further mirror 50 and, after passing through a vertical polarizer 51, falls on a spherical mirror 52 which concentrates the light into a focus 53, from which it passes as a divergent vertically polarized beam 54 toward a plate assembly 55.

Within the assembly 55, a glass support plate 56 has a photographic emulsion 57 of the type used for deep holography coated on its rear surface. Behind the emulsion is a quarterwave plate 58 of the same type described in connection with FIG. 1, and the entire assembly is backed by a mirror 59. The perpendicular axes of the ordinary and extraordinary rays of the plate 58 are bisected by the vertical waves of the reference beam 54 so that the waves of that beam are oriented at 45° to both axes. In this case, quarterwave plate is dimensioned according to the effective wavelength of the waves in the reference beam 54, taking into account their average angle of incidence.

Inasmuch as the beam 54 is polarized perpendicularly with respect to the object illuminating beams 48 and 49, light passing from the object 24 into the emulsion layer cannot interfere with the light of the reference beam to produce interference maxima and minima. Instead, as pointed out above, it merely produces a uniform low level substantially uniform exposure resulting in minimum reflection and scattering of light in the processed photographic layer. After passing through the quarterwave plate 58, the light in the reference beam 54 becomes circularly polarized and, after being reflected back through the plate by the mirror 59, the light is again plane polarized, but, this time, the direction of polarization is at right angles to that of the beam 54. As a result, the reflected reference beam can interfere in the emulsion layer 57 with the light received from the object 24 so as to produce a deep hologram in the manner described above with reference to FIG. 1.

Moreover, because the distance from the mirror 59 to the emulsion layer 57 is permanently fixed, the location of the planes of interference maxima and minima within the emulsion layer is independent of the position of the photographic recording assembly 55 with respect to the other components of the apparatus. In other words, the phase difference between the object-information carrying beam and the reflected reference beam is independent of the position of the plate, being determined only by the distance of the emulsion from the mirror. For this reason, the relative position of the assembly 55 with respect to the other components need not be maintained within a small fraction of a wavelength, as is ordinarily required in holographic recording but, instead, need only be maintained to the same extent required for ordinary photography.

In order to produce a holographic image from a deep hologram recorded in the manner illustrated in FIG. 3, the mirror 59 and quarterwave plate 58 are removed from the assembly 55 and a dark background foil may be placed behind the plate 56. The point light source 35 described in connection with FIG. 2 is located at a position relative to the assembly which is mirror-symmetrical to the location of the focal point 53 of the reference beam 54 when the hologram was made. The eyes of the observer are again positioned on the same side of the hologram as the light source and view a virtual image of the original object on the opposite side of the hologram in the same manner in FIG. 2. It will be apparent that a hologram produced in the manner illustrated in FIG. 3 also contains certain undesired interference patterns resulting from the interaction of the incident reference beam 54 with the portion of the beam from the object 24 which has passed through the quarterwave plate 58 and has then been reflected back through it to the emulsion 57. Upon reproduction of a holographic image in the manner described above, however, the light reflected from those undesired interference patterns will pass through the hologram, rather than being reflected back toward the observer, so that the observer will not be disturbed by them in viewing the image.

In the arrangement described in connection with FIG. 3, it will be noted that the angle of incidence of the reference beam 54 varies from the top of the photographic emulsion, as viewed in FIG. 3, to the bottom thereof. As a result, the effective wavelength of the reference beam in the quarterwave plate varies from the top to the bottom of the plate, so that a plate of uniform thickness cannot be matched to the reference beam wavelength over its entire area. While, in many cases, it will be sufficient merely to match the quarterwave plate to the effective wavelength of the central ray of the reference beam, in other cases this may not be satisfactory.

Figure 4:
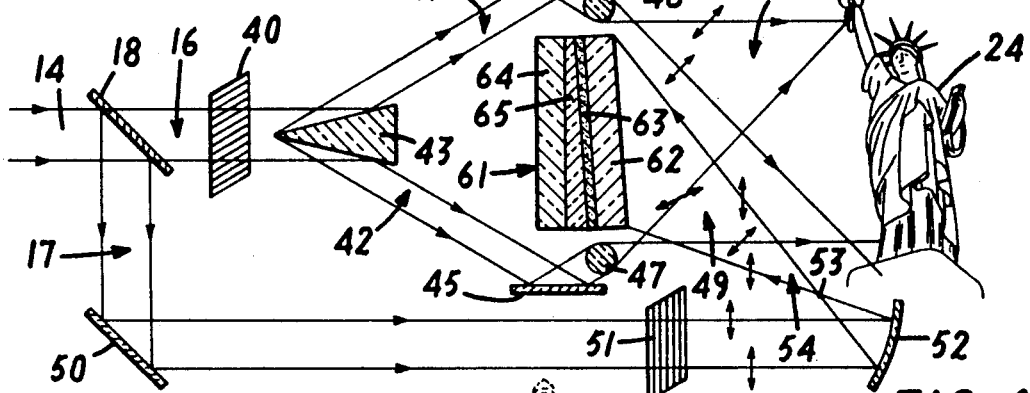
FIG. 4 is a schematic diagram illustrating a modification of the method shown in FIG. 3.

To eliminate this difficulty, a recording assembly having a quarterwave plate of graded thickness may be used, as shown in FIG. 4. In this arrangement, which is otherwise identical to that of FIG. 3, a recording assembly 61 includes a glass support plate 62, a photographic emulsion layer 63, and a mirror 64. Between the photographic emulsion and the mirror is a quarterwave plate 65 having a thickness which increases in the direction from the top to the bottom, as viewed in FIG. 4, the increase in thickness being exaggerated in the drawing for purposes of illustration. The graduation in thickness is arranged so that the thickness at the top of the plate is correct for rays of the reference beam 54 which are incident in that region, these rays impinging at a smaller angle than those at the center of the plate. At the bottom of the assembly, where the angle of incidence is more nearly perpendicular, the quarterwave plate has greater thickness. As a result, the distance traversed within the quarterwave plate 65 is substnatially identical for all rays of the beam 54, and the reflected reference beam is substantially completely plane polarized in the same direction as the light from the object 24 when it interferes therewith in the emulsion 63.

What is claimed is:

1. A method for making a deep hologram comprising directing two beams of monochromatic coherent light wherein the beams are polarized in directions perpendicular to each other toward one side of a photographic layer, and transmitting at least one of the beams through the photographic layer and through a birefringent material and then back through a birefringent material so as to rotate the plane of polarization therein by 90° and then to the photographic layer so as to interfere therein with the other beam, one of the two interfering beams containing holographic image information.

2. A method according to claim 1 including the steps of directing the beam which has been transmitted through the photographic layer through a quarterwave plate toward an object of which a hologram is to be made and back from the object through the quarterwave plate to the photographic layer.

3. A method according to claim 1 including the steps of illuminating an object with one of the beams of polarized monochromatic coherent light and directing the beam from the object toward the side of the photographic layer which receives the beam polarized perpendicular thereto, transmitting one of the beams which has been transmitted through the photographic layer through a quarterwave plate which is rigidly affixed to the photographic layer, and reflecting the same beam back through the quarterwave plate from a reflecting surface on the opposite side thereof from the photographic layer.

4. A method according to claim 1 wherein one of the beams of monochromatic coherent light constitutes a reference beam and is divergent from an off-axis focal point and including the step of illuminating the photographic layer, after processing, from a point source of light located at a corresponding position to the focal point of the reference beam for viewing of the holographic image.

5. A holographic recording assembly comprising a quarterwave plate and of birefringent material and a layer of radiation sensitive photographic material of sufficient depth for deep holography attached in fixed relation to one side thereof.

6. A holographic recording assembly according to claim 5 including a transparent support plate having the plate of birefringent material affixed to one surface thereof and the layer of photographic material affixed to the opposite surface thereof.

7. A holographic recording assembly according claim 5 including a member providing a reflecting surface affixed to the plate of birefringent material on the side opposite from the layer of photographic material.

8. A holographic recording assembly according to claim 5 wherein the plate of birefringent material has divergent surfaces so as to compensate for the varying angle of incidence of a divergent off-axis reference beam.

References Cited

UNITED STATES PATENTS

| 2,348,912 | 5/1944 | Land | 350—157 |
| 2,270,323 | 1/1942 | Land et al. | 350—155UX |
| 2,299,906 | 10/1942 | Land | 350—155 |
| 3,396,266 | 8/1968 | Max et al. | 235—61.11 |

OTHER REFERENCES

Carter, Engeling and Dougal: "Polarization Selection for Reconstructed Wavefronts and Application to Polarizing Micro-Holography," IEEE Journal of Quantum Electronics, vol. 2, No. 2, February 1966.

Nassimbene and Ross: "Reducing Noise in Holograms," IBM Technical Disclosure Bulletin, vol. 8, No. 10, March 1966.

DAVID SCHONBERG, Primary Examiner

R. L. SHERMAN, Assistant Examiner

U.S. Cl. X.R.

350—157

PO-1050
(5/69)

UNITED STATES PATENT OFFICE
CERTIFICATE OF CORRECTION

Patent No. 3,561,838          Dated February 9, 1971

Inventor(s) Dennis Gabor

It is certified that error appears in the above-identified patent and that said Letters Patent are hereby corrected as shown below:

Column 3, line 69, "fratcions" should read -- fractions --;
Column 5, line 34, "substnatially" should read -- substanti
Column 6, line 18, (after "plate") "and" should read -- made
Column 6, line 27, after "according" insert -- to --.

Signed and sealed this 28th day of September 1971.

(SEAL)
Attest:

EDWARD M. FLETCHER, JR.          ROBERT GOTTSCHALK
Attesting Officer                 Acting Commissioner of Paten